(12) United States Patent
McCaslin et al.

(10) Patent No.: US 8,974,098 B2
(45) Date of Patent: Mar. 10, 2015

(54) BICYCLE LIGHT

(75) Inventors: Christopher McCaslin, Alameda, CA (US); Greg Weisenfeld, Carmel Valley, CA (US); Beau Jesse Robertson, Santa Cruz, CA (US); Roxanne Lo, Santa Cruz, CA (US)

(73) Assignee: Light & Motion Industries, Marina, CA (US)

( * ) Notice: Subject to any disclaimer, the term of this patent is extended or adjusted under 35 U.S.C. 154(b) by 51 days.

(21) Appl. No.: 13/470,178

(22) Filed: May 11, 2012

(65) Prior Publication Data

US 2013/0301285 A1  Nov. 14, 2013

(51) Int. Cl.
| | | |
|---|---|---|
| *F21V 7/00* | (2006.01) | |
| *B62J 6/00* | (2006.01) | |
| *F21V 33/00* | (2006.01) | |
| *F21L 4/00* | (2006.01) | |
| *H04M 1/22* | (2006.01) | |
| *F21S 4/00* | (2006.01) | |
| *F21V 21/00* | (2006.01) | |
| *F21S 8/10* | (2006.01) | |
| *F21L 4/02* | (2006.01) | |

(52) U.S. Cl.
USPC ........... 362/473; 362/297; 362/476; 362/346; 362/190; 362/191; 362/249.02; 362/545; 362/184; 362/474

(58) Field of Classification Search
USPC ................. 362/473, 396, 476, 577, 581, 346, 362/190–191, 183, 253, 205, 208, 249.02, 362/307, 297, 242–243, 184, 171, 178, 362/311.06, 475, 540–545, 199, 236, 202, 362/186
See application file for complete search history.

(56) References Cited

U.S. PATENT DOCUMENTS

| | | | | |
|---|---|---|---|---|
| 2,521,251 | A * | 9/1950 | Pettit | 362/109 |
| 4,510,557 | A * | 4/1985 | Tsuyama | 362/188 |
| 5,567,036 | A * | 10/1996 | Theobald et al. | 362/485 |
| 7,121,679 | B2 * | 10/2006 | Fujimoto | 362/186 |
| 7,461,944 | B2 * | 12/2008 | Alessio | 362/184 |
| 8,325,027 | B2 * | 12/2012 | Tee et al. | 340/432 |
| 2007/0159819 | A1 * | 7/2007 | Bayat et al. | 362/236 |

FOREIGN PATENT DOCUMENTS

CN    201680161    12/2010

* cited by examiner

*Primary Examiner* — Peggy Neils
*Assistant Examiner* — William N Harris
(74) *Attorney, Agent, or Firm* — Thomas M. Freiburger (57) ABSTRACT

A bicycle light for securing to a handlebar or other part of a bike, or to a rider's helmet, has an angled front face that allows use of a single, flat LED circuit board with one or more deep conic or parabolic reflectors positioned in front of the upper part of the board and one or more shallow reflectors in front of the bottom part of the board. This provides for both a spot beam produced by the deep reflector and flood light produced by the shallow reflector, in a compact and efficient assembly. Another important feature of the device is side lighting which can be independently controlled, important in affording the rider side lighting while in street traffic but the option to pulse or switch off the side lighting when riding on a trail.

19 Claims, 7 Drawing Sheets

BICYCLE LIGHT

BACKGROUND OF THE INVENTION

This invention concerns bicycle lights attachable to a bicycle (e.g. to handlebars) or to a rider's helmet. In particular the invention concerns a bicycle light of efficient and compact configuration, producing both spot and flood lighting and preferably with side lights.

Front and rear bicycle lights have been available in many different forms. Front bike lights have been provided for attachment to handlebars and to helmets, have been self-contained with battery or wired to a separately mounted battery. The front lights typically have several modes of operation, i.e. steady or flashing, and sometimes have ability to adjust brightness. Some have switched on automatically with darkness. Side lights have been included on a few of them. Many models of front lights have been offered by Planet, Cygolite, Busch & Mueller, NightRider, Cat Eye, Knog, and Light & Motion.

Some bicycle lights have provided light projection with fill light around a spot beam, useful for illuminating trails. Light & Motion's SECA light had upper deep biconic reflectors and lower shallower reflectors behind a single curved front face. The challenges with that design was the difficulty in creating a curved face that is optically clean.

However, in available bicycle lights prior to this invention there has not been a compact and efficient front light providing spot and flood beams, with efficient optics and with optional side lights, as in the bicycle light described below.

SUMMARY OF THE INVENTION

As explained above, the optimum beam pattern for a bike light has a deep-penetrating spot beam down the center, with fill light to the sides to illuminate trail edges while allowing the rider to see far down the trail. An efficient way to achieve this beam pattern, in accordance with the invention, is with reflector cones, which requires two reflector cones, one to essentially collimate light from one or more LEDs, and the other to direct LED light more widely as a flood beam, at a wide enough angle to fill in the sides of the trail for a bike rider. An efficient spot beam generator must be a deep cone or parabolic reflector receiving and projecting the light of one or more LEDs. However, for flood light, or fill light, a shallower reflector cone is needed (the flood reflector could also be deep, but if so must spread widely so as to require additional total area at the front end of the light). In the compact and efficient construction of the current invention the deep spot and wider angle beams are positioned one above the other, so that the deeper reflector cone extends from an LED circuit board farther forward than the adjacent shallow, wider-angle reflector. The two reflectors are positioned closely adjacent to one another, preferably formed in the same component. A window plate of the housing, just forward of the reflector component, is angled with respect to vertical (and with respect to the LED circuit board), affording greater depth as needed for the spot beam reflector and lesser depth as needed for the flood reflector. Preferably the spot beam is above the flood beam, so that the window plate angles downwardly, preferably about 12° with respect to vertical or with respect to the LED circuit board. The angle should be at least 7°, more preferably at least about 10°; and optimally 12° to 15°.

Another feature of the invention is side lights provided on the light housing, preferably amber light, for safety in traffic. These side lights may comprise amber lenses or windows, fed by one or more LEDs separate from the spot and flood LEDs (or the lenses can be clear and colorless, with the side LEDs being color LEDs). An important feature of the front light of the invention is a separate switch for the side lights, to optionally switch them off when not needed, such as on a trail. A second switch is provided, serving under the main switch, so that the side lights cannot be activated without the main lights, but while the main lights are operating, the side lights can be on, or switched to a pulse mode, or off.

It is among the objects of the invention to provide a front bicycle light with an optimum beam pattern while also providing for efficient use of the light either in traffic or on a trail. These and other objects, advantages and features of the invention will be apparent from the following description of a preferred embodiment, considered along with the accompanying drawings.

DESCRIPTION OF PREFERRED EMBODIMENTS

Figure 1:
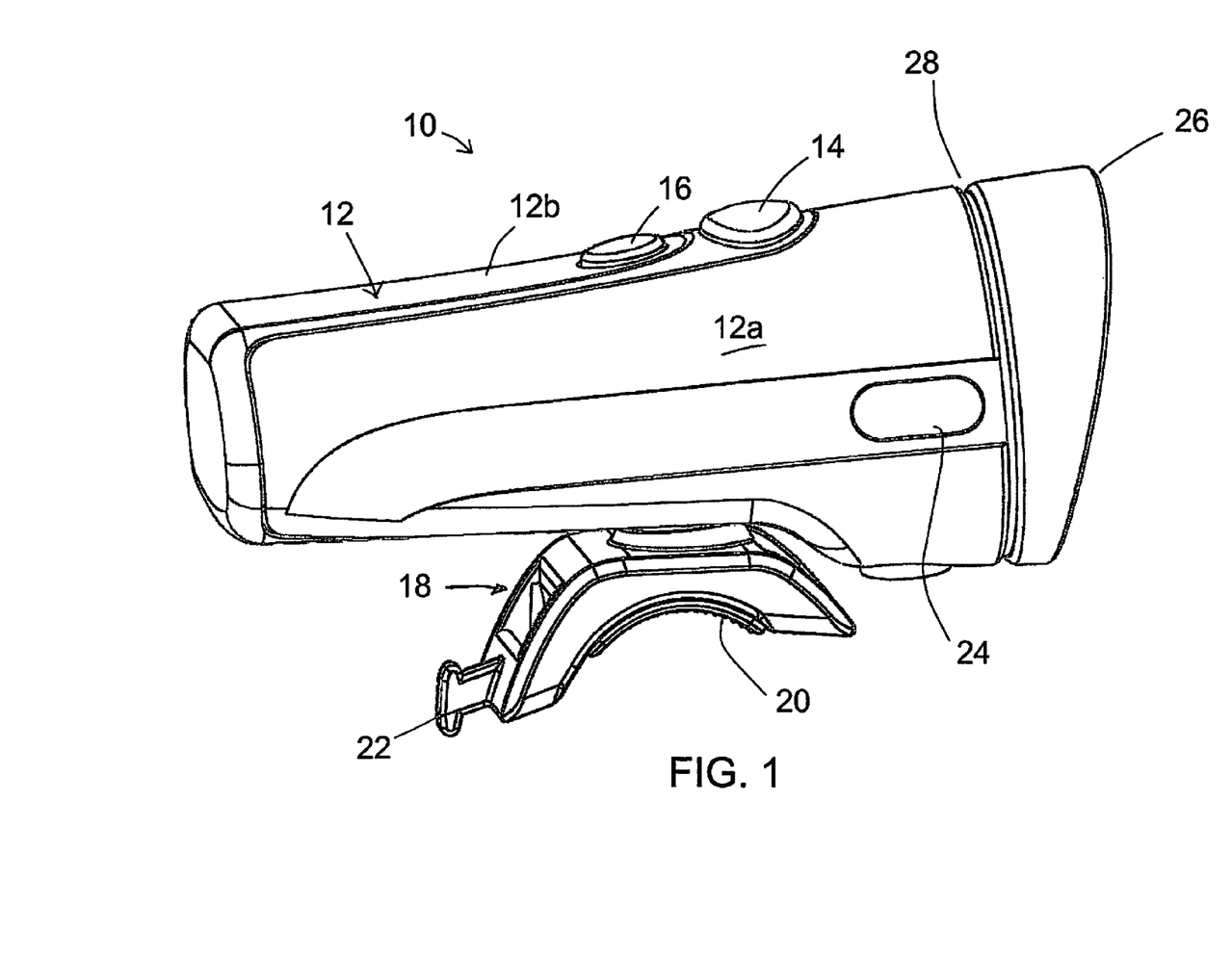
FIG. 1 is a perspective view showing a bicycle light according to the invention.

FIG. 1 shows a front bicycle light 10 of the invention, with a housing or casing 12 on which are mounted push button type switches 14 and 16, preferably at a top side as shown.

A connector bracket 18 is seen secured to the bottom side of the light casing 12. In a preferred form this connector has a handlebar-engaging surface 20, appropriately curved as shown, and a connection point 22 for a flexible, stretchable strap to be wrapped tightly around the bottom of the handlebar and secured back to the connector device 18. Other forms of connection to a bicycle can be used.

Left and right side lights 24 are included in a preferred embodiment of the front light of the invention. These project yellow or amber light, but other colors are also possible.

The front end 26 of the bicycle light is angled downwardly, as described above. The downward angle is relative to vertical or with respect to a plane indicated at 28 and defined by a decorative circumferential groove as shown (the plane being perpendicular to the length of the casing 12). This downward angle is also relative to an LED circuit board, described below.

Figure 2:
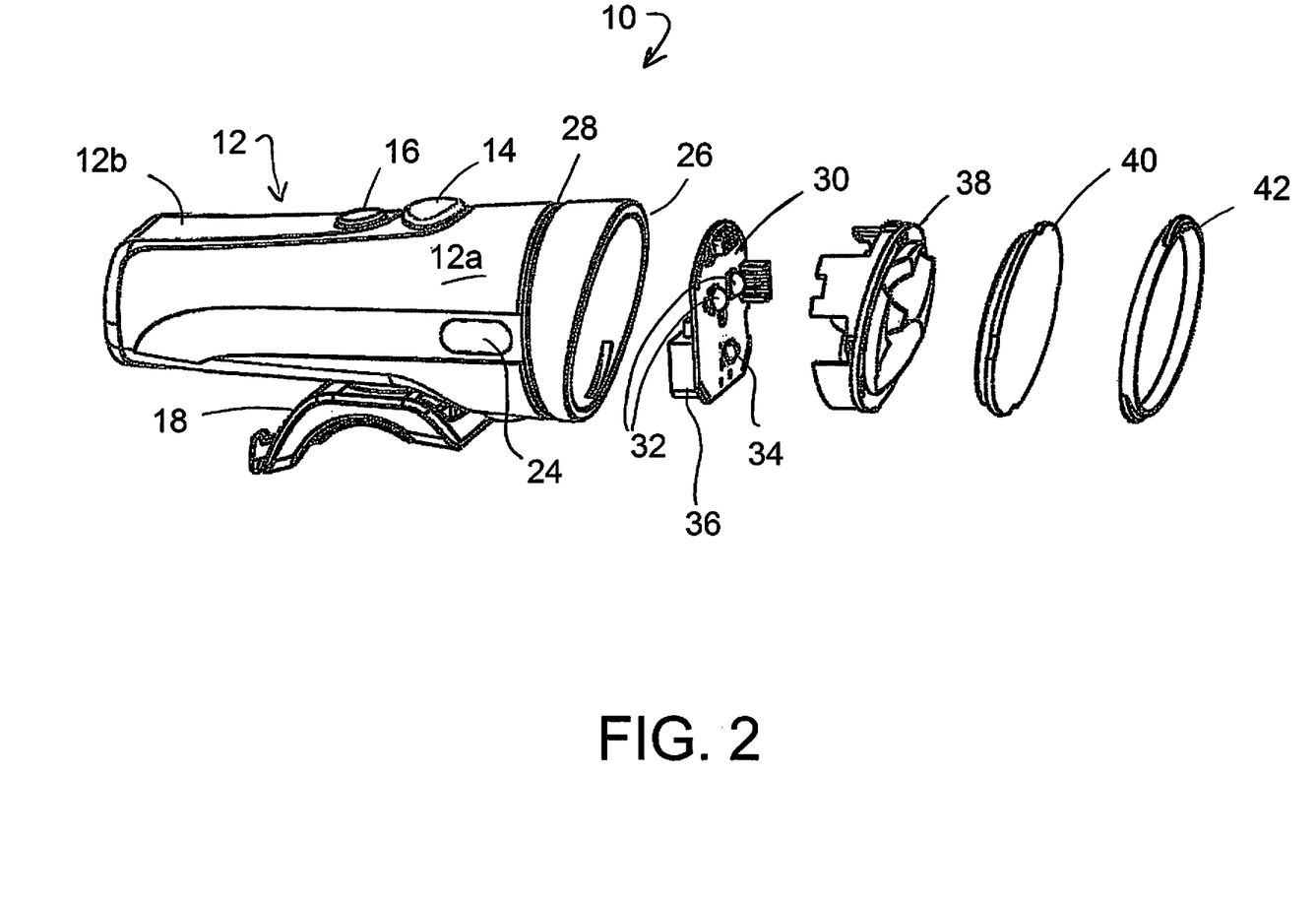
FIG. 2 is an exploded perspective view showing the bicycle light.

As indicated in the partially exploded view of FIG. 2, the bicycle light assembly 10 has an internal LED circuit board 30 supporting, in this preferred embodiment, two upper LEDs 32 and a lower LED 34, with some of the LED driver electronics indicated at 36. The LED board 30 is mounted essentially vertically within the casing 12, that is, essentially perpendicular to the direction of light projection from the head lamp 10. As explained above, however, other components are angled downwardly, including a multi-cone LED light reflector 38, a transparent window or port 40, and a snapped-in securing bezel 42. The reason for this angled relationship is to accommodate the required deeper reflectors for the upper LEDs 32, which form a spot beam for deeper penetration into the darkness along a trail, and a shallower reflector as required for the lower LED 34, which produces a wider flood beam. The angling of the front face of the head lamp device conserves space and total size and volume of the device, while efficiently providing for spot and flood beams.

Figure 2A:
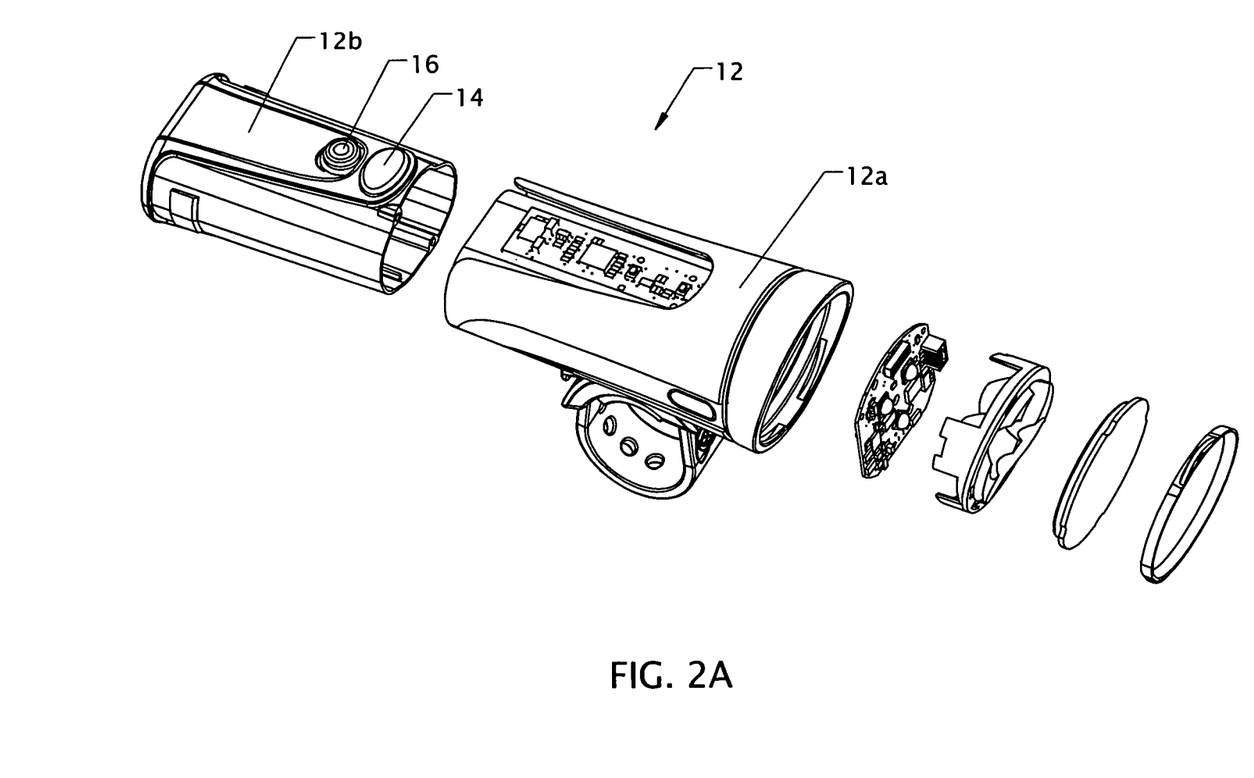
FIG. 2A is another exploded view.
Figure 4:
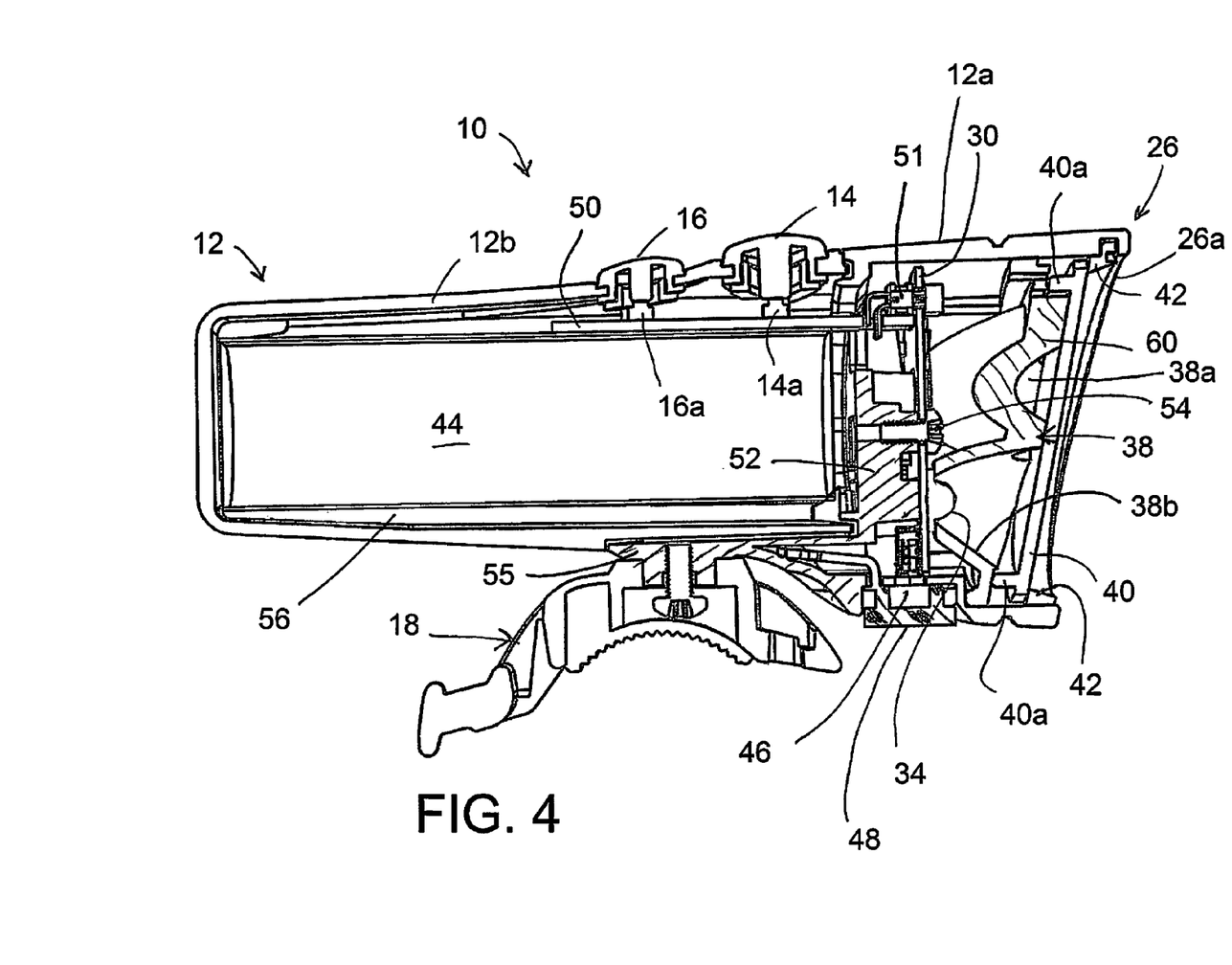
FIG. 4 is a side elevation view in section, as seen along the plane 4-4 in FIG. 3, showing internal components of the assembled bicycle light.

FIG. 2A shows the casing 12 exploded, revealing a preferred construction with the casing being assembled from a metal housing component 12*a* and a plastic housing component 12*b*, the latter carrying the push button switch activators 14 and 16 and receiving a battery (shown in FIG. 4). The metal housing component 12*a* dissipates heat.

Figure 3:
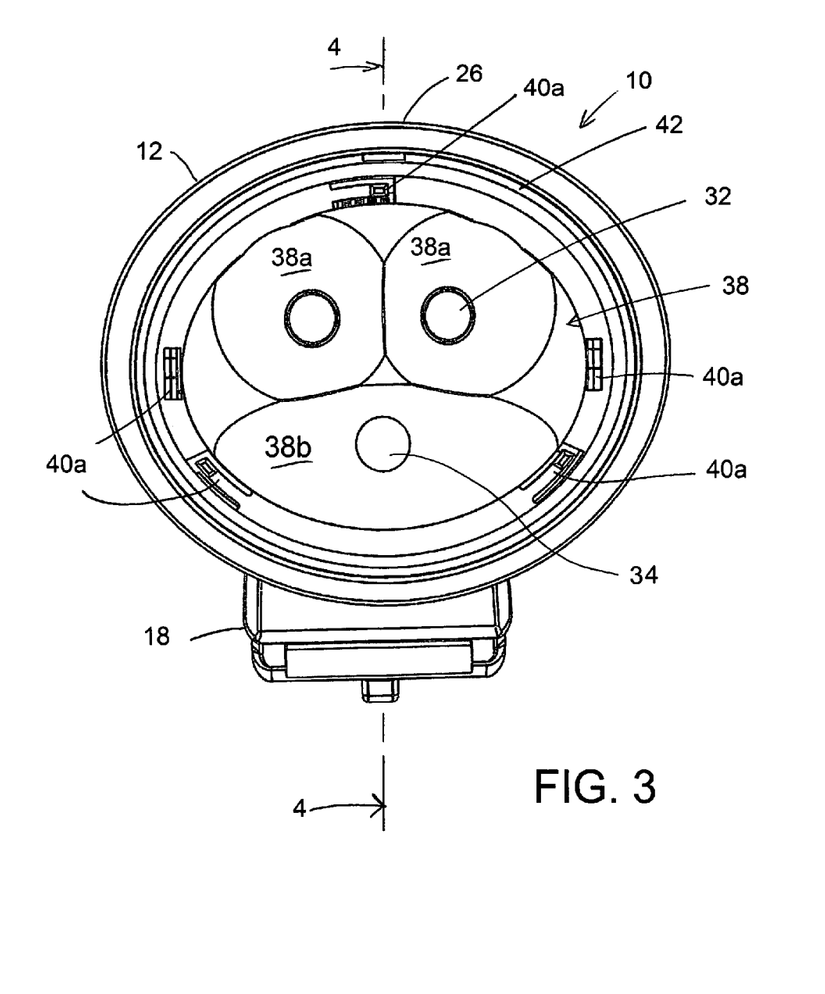
FIG. 3 is a frontal view showing components of the bicycle light.

FIG. 3 shows the assembled bicycle head lamp 10 in a frontal view. The integrated reflector block 38 is shown, with its three reflector cones 38*a* and 38*b*, in position to produce the spot beam from the LEDs 32 and the flood beam from the LED 34. The word "cone" is used to mean a reflector of an effective shape to produce the beam desired, typically a parabolic reflector, not usually in the shape of a true cone. The reflector device 38 is preferably a single unit with the three reflectors, and it can be produced of metallized molded plastic. The bottom reflector 38*b* may be greater in width than height, to produce the desired wide flood beam to illuminate a wide area in front of the rider, including the sides of a trail. FIG. 3 shows that the headlamp casing 12, at its front end 26 and preferably also through its length, is elliptical or oblong in cross section, although it could be other shapes, including circular.

FIG. 3 also shows the snapped-in securing bezel 42, a top clip 42*a*, and legs or standoffs 40*a* that are integral with the window 40 to position the window correctly (see FIG. 4).

FIG. 4 shows the bicycle head lamp 10 in side elevational section as seen along the midline. The casing or housing 12 contains a relative large battery 44, preferably a rechargeable battery, chargeable via a charging port 46, which can be a micro USB port, protected by a removable cover 48. Also shown are the two switches 14 and 16 that are included in a preferred embodiment. The switch 14 is a main switch, which will turn on the spot and flood lights together, with additional pushes of the switch providing a different light level or a pulsing mode, and also switching off the head lamp. Operation of the switch 16 requires that the main switch 14 be on at one of its settings; the switch 16 operates the side lights indicated at 24 in FIGS. 1 and 2 and also shown in FIG. 5. This gives the bike rider the option to use side lighting for urban riding, but to switch off the side lights when riding on trails. Additional settings such as flashing of the side lights can also be provided. The external push-button switches 14 and 16 operate momentary switches 14*a*, 16*a* inside the housing, these being connected on a switch circuit board 50 which connects with the battery 44 and with the LED board 30, and supports some of the LED driver electronics. A connector from the PC board 50 to the LED board is shown at 51. The LED driver requires some space, and the components that heat up most are on the LED pcb 30 for best heat dissipation as explained below.

FIG. 4 also shows that the LED circuit board 30 is secured to a metal heat sink block 52 via machine screws 54 (only one of which is visible in FIG. 4), the block 52 being in heat conducting contact with the metal exterior portion 12*a* of the casing and with a mounting base 55 (with which the block 52 preferably is integral), which connects to the connector bracket 18. This dissipates heat from the battery and particularly from the LED board 30. In FIG. 4 a plastic rib 56 is seen below and supporting the battery 44.

At the front end of the head lamp 10, FIG. 4 shows the multi-cone reflector 38. Since this cross section is taken through the midline of the head lamp device, a shared wall 60 of the two top reflectors 38*a* is seen, indicated in cross section. The lower LED 34 is visible in cross section, but the upper LEDs 32 are not seen in FIG. 4. Just left of the junction area 60 in FIG. 4 is seen the exterior of the left-side reflector 38*a*.

FIG. 4 shows the end profile of the front 26 of the housing as an inwardly curving line 26*a*. This is a decorative feature by which the front end sweeps concavely inwardly at left and right.

Figure 5:
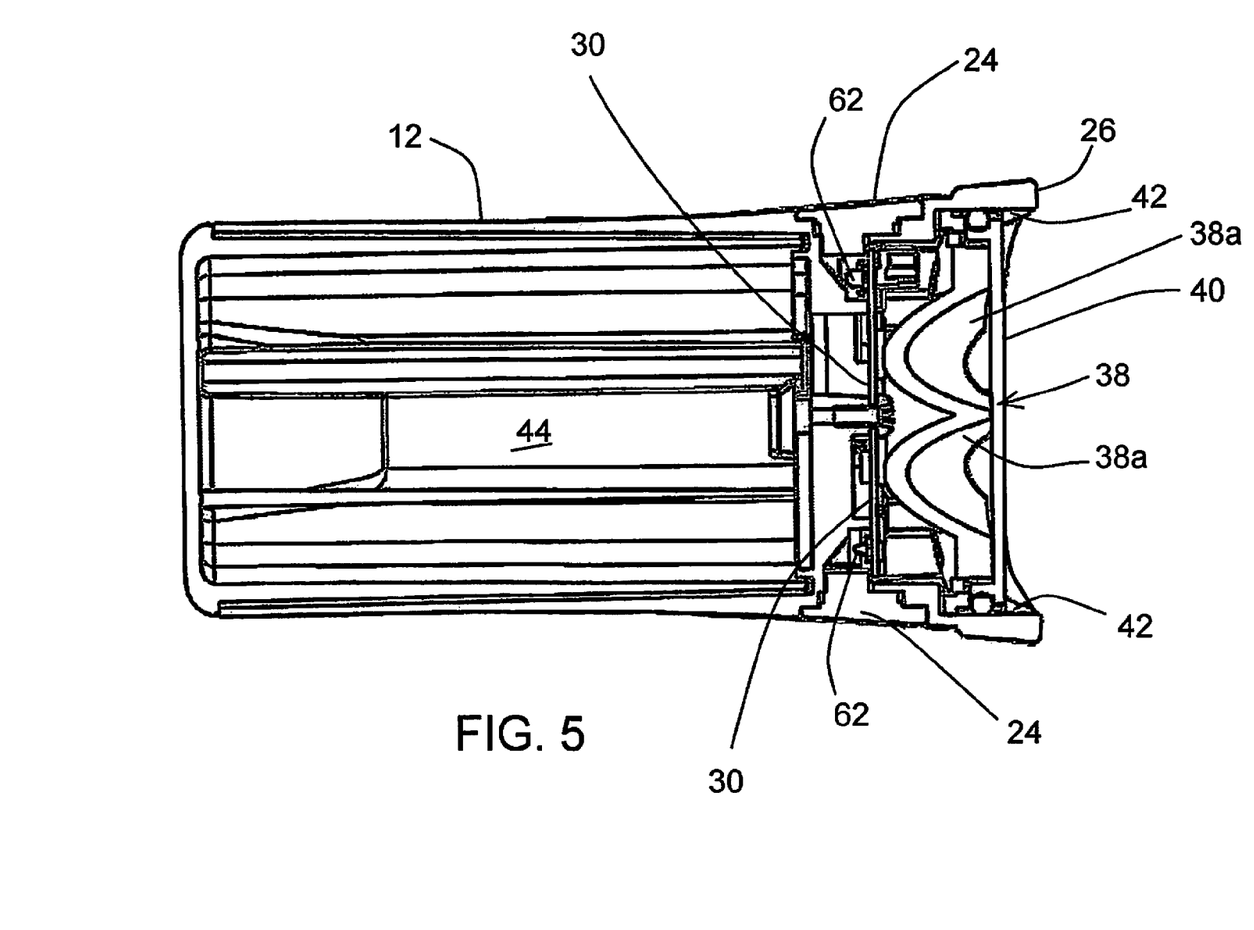
FIG. 5 is a detailed view in top plan section showing components of side lights of the device.

FIG. 5 shows the bicycle light 10 in a cross section taken on a horizontal plane approximately at mid-level through the housing, at the level of the side lights 24 seen in FIG. 1. The side light structures 24 are each light pipes/lenses to carry light from internal LEDs 62 to the sides of the head lamp. Each side light LED 62 is preferably mounted on the back side of the LED board 30. Although the light pipes/lenses 24 could be amber colored with the LED producing approximately white light, preferably the LEDs have the yellow or amber color, with the light pipes/lenses 24 being clear, essentially without color.

Figure 6:
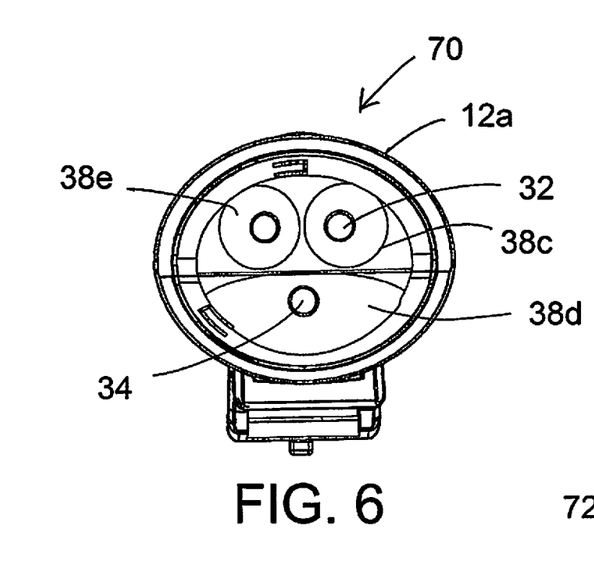
FIGS. 6 and 7 are front and perspective views showing another embodiment of the bicycle light of the invention.
Figure 7:
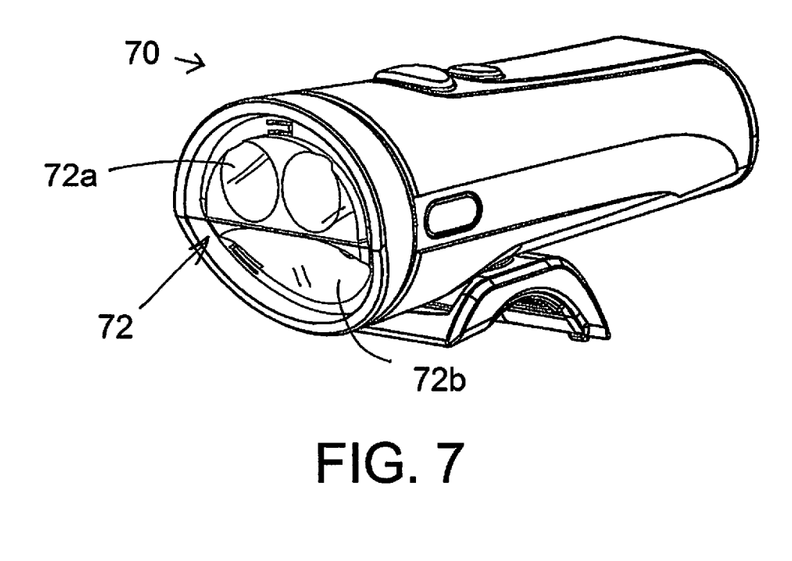

FIGS. 6 and 7 show a modified embodiment of the bicycle light 70 of the invention. The light structure 70 is similar to the light 10 of the first embodiment, having upper and lower LEDs 32 and 34 on a common printed circuit board (not shown), oriented generally upright in the housing 12*a*, and with a reflector structure 38*c* which again has a lower, shallower reflector cone 38*d* for wide angle beam projection. The lower reflector cone 38*d*, not being as deep as the spot reflector cones 38*e* above, does not protrude as far forward at the front of the light housing, thus being receded with respect to the reflector cones 38*e*. The difference from the earlier embodiment is that the front window 72 of the light assembly is not a sloped single plane but instead has two separate planar sections, an upper part which is a plane 72*a* and which may be essentially vertical and perpendicular to the light path, and a lower part which is a plane 72*b* which is sloped back, to conform to the receded lower reflector 38*d* surface. The window 72 can be a single plastic molding comprising the two separate planes 72*a* and 72*b*.

In other respects the light assembly 70 is similar to that described above, especially with regard to internal components. The LED circuit board (not shown) is vertical or approximately vertical, essentially perpendicular to the light path. The reflector block 38*c* is similar to that shown in FIG. 4 but with the upper portion having an essentially vertically oriented front and the lower portion being angled or recessed to recede as described above. The angle of this lower portion can be in the range of about 15° to 30°. When angles are described herein as "about" a specific number of degrees, this should be considered as including a range of ten percent above and below that figure.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A bicycle light, comprising:
a light housing,
a connector on the housing for securing the bicycle light to a bicycle or to a user,
a battery contained within the housing,
an LED circuit board within the housing, and including an external switch on the housing for providing power from the battery to the LED circuit board when desired, the LED circuit board being essentially planar and containing at least one surface-mounted LED in an upper part of the board and at least one surface-mounted LED in a lower part of the board, both LEDs directed toward a front end of the housing, reflectors positioned in the housing directly in front of the LED circuit board to reflect light from the LEDs in a forward direction out the front of the housing, the reflector at the upper LED being a deep reflector producing a spot beam and the reflector at the lower LED being a shallow reflector, shallower than the deep reflector and extending forward less than the deep reflector and producing a flood light beam out through the front of the housing, and a front port or window in the housing including a transparent window plate sealed in the housing, at least a part of the window plate being planar and angled obliquely downwardly relative to the LED circuit board and relative to the direction of projection of light from the LEDs, such that a lower part of the window plate is receded farther back than an upper part of the window plate, so as to provide greater depth of space in the housing accommodating the deeper reflector in the upper part of the housing, the deeper reflector occupying such greater depth of space, and lesser depth of space accommodating the shallow reflector in the lower part of the housing, the shallow reflector occupying such lesser depth of space.

2. The bicycle light of claim 1, wherein the window plate upper part is essentially vertical and the window plate lower part is angled.

3. The bicycle light of claim 2, wherein the window plate lower part is angled about 15° from vertical.

4. The bicycle light of claim 2, wherein the window plate is an integrally formed plastic molding.

5. The bicycle light of claim 1, wherein the window plate defines a single plane.

6. The bicycle light of claim 5, wherein the window plate is angled at least about 7° from the planar LED circuit board.

7. The bicycle light of claim 5, wherein the window plate is angled at least about 10° from the planar LED circuit board.

8. The bicycle light of claim 5, wherein the window plate is angled about 12° the planar LED circuit board.

9. The bicycle light of claim 1, wherein the deep reflector at the upper LED is a parabolic reflector.

10. The bicycle light of claim 1, wherein the deep reflector at the upper LED is a biconic reflector.

11. The bicycle light of claim 1, with two LEDs in the upper part of the circuit board, a said deep reflector being provided for each of the upper LEDs.

12. The bicycle light of claim 1, wherein the battery is a rechargeable battery, and the housing including a micro USB charging port for recharging the battery.

13. The bicycle light of claim 1, further including left and right side lights on the housing, the side lights producing amber light.

14. The bicycle light of claim 13, wherein the side lights include at least one side light LED, including a second switch on the housing, independently controlling the side light LED so that the side lights need not be on when the forward-projecting lights are on.

15. The bicycle light of claim 14, wherein the side light LED is mounted on the LED circuit board.

16. A bicycle light, comprising:
a light housing,
a connector on the housing for securing the bicycle light to a bicycle or to a user,
a battery contained within the housing,
an LED circuit board within the housing, and including an external switch on the housing for providing power from the battery to the LED circuit board when desired, the LED circuit board containing at least one LED directed toward a front end of the housing,
a reflector positioned in the housing directly in front of the LED circuit board to reflect light from the LED in a forward direction out the front of the housing,
a single side light LED in the housing and side light means for directing light from the side light LED to side light windows at left and right on the housing, for side lights, and
a second switch on the housing, independently controlling the side light LED so that the side lights need not be on when the forward-projecting lights are on.

17. bicycle light of claim 16, wherein the side light means comprises light pipes from the side light LED to the side light windows.

18. The bicycle light of claim 16, wherein the side light LED is mounted on a back side of the LED circuit board.

19. The bicycle light of claim 16, wherein the light housing comprises two parts, a front metal part and a rear plastic part, the rear part containing the battery and sliding into the front part as assembled, the external switch being supported on the plastic part and the metal part serving to dissipate heat to exterior of the bicycle light.

\* \* \* \* \*